(12) United States Patent
Hamakubo et al.

(10) Patent No.: US 12,742,942 B2
(45) Date of Patent: Sep. 22, 2026

(54) RESIN COMPOSITION FOR COLORED COATING ON OPTICAL FIBER, OPTICAL FIBER, AND OPTICAL FIBER RIBBON

(71) Applicant: SUMITOMO ELECTRIC INDUSTRIES, LTD., Osaka (JP)

(72) Inventors: Katsushi Hamakubo, Osaka (JP); Noriaki Iwaguchi, Osaka (JP); Miho Ikegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 288 days.

(21) Appl. No.: 18/724,261

(22) PCT Filed: Nov. 21, 2023

(86) PCT No.: PCT/JP2023/041878

§ 371 (c)(1),
(2) Date: Jun. 26, 2024

(87) PCT Pub. No.: WO2024/135207

PCT Pub. Date: Jun. 27, 2024

(65) Prior Publication Data

US 2025/0258353 A1 Aug. 14, 2025

(30) Foreign Application Priority Data

Dec. 21, 2022 (JP) ................................ 2022-204166

(51) Int. Cl.
*G02B 6/44* (2006.01)
*C09D 7/41* (2018.01)
(Continued)

(52) U.S. Cl.
CPC ............ *G02B 6/4482* (2013.01); *C09D 7/41* (2018.01); *C09D 7/61* (2018.01); *C09D 7/63* (2018.01); *G02B 6/02395* (2013.01)

(58) Field of Classification Search
CPC .... G02B 6/02395; G02B 6/4482; C09D 7/41; C09D 7/61; C09D 7/63
See application file for complete search history.

(56) References Cited

U.S. PATENT DOCUMENTS

2017/0307814 A1 10/2017 Tachibana et al.
2024/0052173 A1* 2/2024 Hamakubo ......... C03C 25/6226
(Continued)

FOREIGN PATENT DOCUMENTS

JP H6-242355 A 9/1994
JP H09-142889 A 6/1997
(Continued)

*Primary Examiner* — Rhonda S Peace
(74) *Attorney, Agent, or Firm* — McDonald Hopkins LLC

(57) ABSTRACT

A resin composition for colored coating on an optical fiber contains a photopolymerizable compound, a photopolymerization initiator, a photosensitizer, and an organic pigment, in which the photosensitizer includes at least one selected from the group consisting of an anthracene-based photosensitizer and a naphthalene-based photosensitizer, and a content of the photosensitizer is 0.01 parts by mass or more and less than 3.00 parts by mass with respect to 100 parts by mass of the total amount of the photopolymerizable compound.

9 Claims, 3 Drawing Sheets

(51) Int. Cl.

| | |
|---|---|
| ***C09D 7/61*** | (2018.01) |
| ***C09D 7/63*** | (2018.01) |
| ***G02B 6/02*** | (2006.01) |

(56) References Cited

U.S. PATENT DOCUMENTS

2025/0237808 A1* 7/2025 Hamakubo ........... C03C 25/105
2025/0258353 A1* 8/2025 Hamakubo ............. C03C 25/24

FOREIGN PATENT DOCUMENTS

| | | | |
|---|---|---|---|
| JP | 2001-294449 | A | 10/2001 |
| JP | 2003-279811 | A | 10/2003 |
| JP | 2016-070966 | A | 5/2016 |
| JP | 2022-533793 | A | 7/2022 |
| WO | 97/19029 | A1 | 5/1997 |
| WO | 2016/047002 | A1 | 3/2016 |
| WO | 2020/239563 | A1 | 12/2020 |
| WO | 2022/190693 | A1 | 9/2022 |

* cited by examiner

RESIN COMPOSITION FOR COLORED COATING ON OPTICAL FIBER, OPTICAL FIBER, AND OPTICAL FIBER RIBBON

TECHNICAL FIELD

The present disclosure relates to a resin composition for colored coating on an optical fiber, an optical fiber, and an optical fiber ribbon.

This application claims priority to Japanese Patent Application No. 2022-204166 filed Dec. 21, 2022, the entire content of which is incorporated herein by reference.

BACKGROUND ART

An optical fiber generally has a coating resin layer for protecting a glass fiber that is an optical transmission medium. The coating resin layer has, for example, a primary resin layer and a secondary resin layer.

An outermost layer of the coating resin layer includes a colored resin layer for identifying the optical fiber (see, for example, Patent Literatures 1 to 3).

CITATION LIST

Patent Literature

Patent Literature 1: JP H6-242355 A
Patent Literature 2: JP 2003-279811 A
Patent Literature 3: WO 2016/047002 A1

SUMMARY OF INVENTION

A resin composition for colored coating on an optical fiber according to an aspect of the present disclosure contains a photopolymerizable compound, a photopolymerization initiator, a photosensitizer, and an organic pigment, in which the photosensitizer includes at least one selected from the group consisting of an anthracene-based photosensitizer and a naphthalene-based photosensitizer, and a content of the photosensitizer is 0.01 parts by mass or more and less than 3.00 parts by mass with respect to 100 parts by mass of the total amount of the photopolymerizable compound.

DESCRIPTION OF EMBODIMENTS

Figure 1:
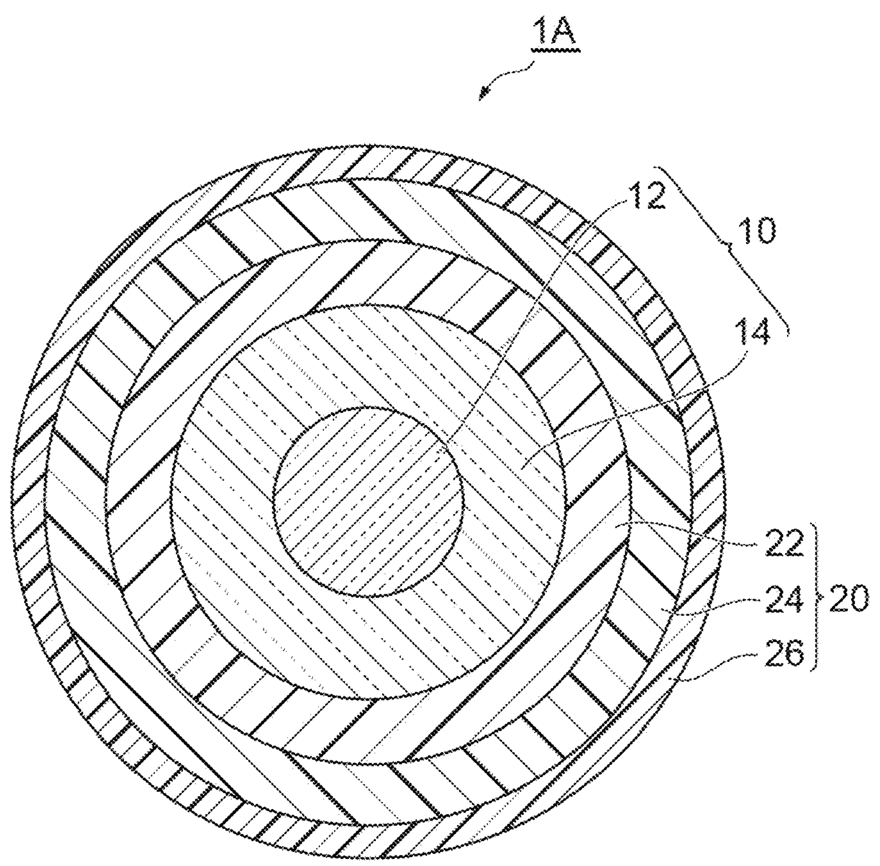
FIG. 1 is a schematic cross-sectional view illustrating an example of an optical fiber according to the present embodiment.

Problems to Be Solved by the Present Disclosure

An optical fiber may be used in the form of an optical fiber ribbon including a plurality of optical fibers arranged and collectively integrated with a ribbon resin. In an optical fiber ribbon using an optical fiber having a colored resin layer, when an operation of taking out the optical fiber by removing a ribbon material is performed, a phenomenon that the colored resin layer is peeled off from the optical fiber, that is, so-called "color peeling" may occur. In particular, in the case of forming a colored resin layer using a resin composition containing an organic pigment, color peeling is likely to occur.

An object of the present disclosure is to provide a resin composition for colored coating on an optical fiber by which an optical fiber in which color peeling is less likely to occur even in the presence of an organic pigment, can be produced, an optical fiber, and an optical fiber ribbon.

Effects of the Present Disclosure

According to the present disclosure, it is possible to provide a resin composition for colored coating on an optical fiber by which an optical fiber in which color peeling is less likely to occur even in the presence of an organic pigment, can be produced, an optical fiber, and an optical fiber ribbon.

Description of Embodiments of the Present Disclosure

First, the contents of embodiments of the present disclosure will be listed and described.

(1) A resin composition for colored coating on an optical fiber according to an aspect of the present disclosure contains a photopolymerizable compound, a photopolymerization initiator, a photosensitizer, and an organic pigment, in which the photosensitizer includes at least one selected from the group consisting of an anthracene-based photosensitizer and a naphthalene-based photosensitizer, and a content of the photosensitizer is 0.01 parts by mass or more and less than 3.00 parts by mass with respect to 100 parts by mass of the total amount of the photopolymerizable compound.

When such a resin composition contains a specific amount of a specific photosensitizer, an optical fiber in which color peeling is less likely to occur even in the presence of an organic pigment can be produced.

(2) In the above (1), from the viewpoint that color peeling is further less likely to occur, the anthracene-based photosensitizer may include at least one selected from the group consisting of 9,10-diethoxyanthracene, 9,10-dibutoxyanthracene, and 9,10-bis(octanoyloxy)anthracene.

(3) In the above (1), from the viewpoint that color peeling is further less likely to occur, the naphthalene-based photosensitizer may include 1,4-diethoxynaphthalene.

(4) In any of the above (1) to (3), from the viewpoint that color peeling is further less likely to occur, the organic pigment may include at least one selected from the group consisting of a phthalocyanine-based pigment and an azo-based pigment.

(5) In any of the above (1) to (4), from the viewpoint of coloring the resin layer, titanium oxide may be further contained.

(6) An optical fiber according to an aspect of the present disclosure includes a glass fiber including a core and a cladding, a primary resin layer being in contact with the glass fiber and coating the glass fiber, a secondary resin layer coating the primary resin layer, and a colored resin layer coating the secondary resin layer, in which the colored resin layer contains a cured product of the resin composition described in any one of the above (1) to (5). By applying the resin composition to the colored resin layer, an optical fiber in which color peeling is less likely to occur can be produced.

(7) An optical fiber according to an aspect of the present disclosure includes a glass fiber including a core and a cladding, a primary resin layer being in contact with the glass fiber and coating the glass fiber, and a secondary resin layer coating the primary resin layer, in which the secondary resin layer contains a cured product of the resin composition described in any one of the above (1) to (5). By applying the resin composition to the secondary resin layer, an optical fiber in which color peeling is less likely to occur can be produced.

(8) An optical fiber ribbon according to an aspect of the present disclosure in which a plurality of optical fibers described in the above (6) or (7) are arranged in parallel and coated with a ribbon resin. In such an optical fiber ribbon, when an operation of taking out the optical fiber is performed, color peeling is less likely to occur.

Details of Embodiments of the Present Disclosure

Specific examples of a resin composition, an optical fiber, and an optical fiber ribbon according to embodiments of the present disclosure will be described with reference to the drawings as necessary. Note that, the present disclosure is not limited to these illustrations but is indicated by the claims and intended to include meanings equivalent to the claims and all modifications within the claims. In the following description, the same reference numerals are given to the same elements in the description of the drawing, and redundant description will be omitted. In the present specification, (meth)acrylate means an acrylate or its corresponding methacrylate. The same applies to other similar expressions such as (meth)acryloyl.

Resin Composition

A resin composition for colored coating on an optical fiber according to the present embodiment contains a photopolymerizable compound, a photopolymerization initiator, a photosensitizer, and an organic pigment, in which the photosensitizer includes at least one selected from the group consisting of an anthracene-based photosensitizer and a naphthalene-based photosensitizer, and a content of the photosensitizer is 0.01 parts by mass or more and less than 3.00 parts by mass with respect to 100 parts by mass of the total amount of the photopolymerizable compound. The resin composition for colored coating on an optical fiber according to the present embodiment is an ultraviolet curable resin composition.

The organic pigment has a light absorption area mainly in the visible area, and the light absorption area is extended to the near ultraviolet area. In a case where a colored resin layer of an optical fiber is formed by curing a resin composition containing an organic pigment by irradiation of light such as ultraviolet rays, the curing failure of the resin layer surface is likely to occur. Thereby, when the optical fiber is taken out by removing a ribbon material from the optical fiber ribbon, the color peeling of the optical fiber is likely to occur. The anthracene-based photosensitizer and the naphthalene-based photosensitizer are photosensitizers having an absorption wavelength at around 300 to 400 nm, and by using a specific amount of such a specific photosensitizer, even in the presence of an organic material, the curing of the resin layer becomes favorable, and an optical fiber in which color peeling is less likely to occur can be formed.

The photopolymerizable compound is not particularly limited, and from the viewpoint of adjusting the Young's modulus of the resin layer, may contain at least one (meth) acrylate selected from the group consisting of urethane (meth)acrylate and epoxy (meth)acrylate. The photopolymerizable compound according to the present embodiment is distinguished from a polydimethylsiloxane compound having a (meth)acryloyl group described below in that the photopolymerizable compound does not have a dimethylsiloxane skeleton.

As the urethane (meth)acrylate, for example, a urethane oligomer obtained by reacting a polyol compound, a polyisocyanate compound, and a hydroxyl group-containing (meth)acrylate compound can be used. The urethane (meth) acrylate may be used singly or as a mixture of two or more kinds thereof.

Examples of the polyol compound include polytetramethylene glycol, polypropylene glycol, and bisphenol A-ethylene oxide addition diol. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth) acrylate, 2-hydroxypropyl (meth)acrylate, and tripropylene glycol mono(meth)acrylate.

From the viewpoint of adjusting the Young's modulus of the resin layer, the number average molecular weight (Mn) of the polyol compound may be 300 or more and 3000 or less, 400 or more and 3000 or less, or 500 or more and 2500 or less.

As a catalyst when the urethane (meth)acrylate is synthesized, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of easy availability or catalyst performance, dibutyltin dilaurate or dibutyltin diacetate may be used as a catalyst.

A lower alcohol having 5 or less carbon atoms may be used when the urethane (meth)acrylate is synthesized. Examples of the lower alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Examples of the epoxy (meth)acrylate include an aliphatic epoxy (meth)acrylate and an aromatic epoxy (meth)acrylate. The aliphatic epoxy (meth)acrylate means an epoxy (meth) acrylate having no aromatic ring, and the aromatic epoxy (meth)acrylate means an epoxy (meth)acrylate having an aromatic ring. The epoxy (meth)acrylate may be used singly or as a mixture of two or more kinds thereof.

As the aliphatic epoxy (meth)acrylate, for example, a reaction product of an aliphatic epoxy compound having two or more glycidyl groups and a compound having a (meth) acryloyl group such as (meth)acrylic acid can be used.

From the viewpoint of enhancing the toughness of the resin layer, the aliphatic epoxy (meth)acrylate may have an ethylene oxide group or a propylene oxide group. Examples of the aliphatic epoxy (meth)acrylate include a (meth)acrylic acid adduct of propylene glycol diglycidyl ether, a (meth) acrylic acid adduct of polypropylene glycol diglycidyl ether, a (meth)acrylic acid adduct of ethylene glycol diglycidyl ether, and a (meth)acrylic acid adduct of polyethylene glycol diglycidyl ether.

As the aromatic epoxy (meth)acrylate, for example, a reaction product of an aromatic epoxy compound having two or more glycidyl groups and a compound having a (meth)acryloyl group such as (meth)acrylic acid can be used. Examples of the aromatic epoxy (meth)acrylate include a (meth)acrylic acid adduct of bisphenol A diglycidyl ether.

From the viewpoint of increasing the strength of the resin layer, the content of the epoxy (meth)acrylate may be 10% by mass or more and 75% by mass or less, 20% by mass or more and 70% by mass or less, 30% by mass or more and 65% by mass or less, or 40% by mass or more and 60% by mass or less, based on the total amount of the photopolymerizable compound.

The photopolymerizable compound can contain a photopolymerizable compound (hereinafter, referred to as "monomer") other than the urethane (meth)acrylate and the epoxy (meth)acrylate.

As the monomer, a monofunctional monomer having one polymerizable group or a polyfunctional monomer having two or more polymerizable groups can be used. The monomer may be used singly or as a mixture of two or more kinds thereof.

Examples of the monofunctional monomer include (meth) acrylate-based monomers such as methyl (meth)acrylate, ethyl (meth)acrylate, propyl (meth)acrylate, n-butyl (meth) acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth) acrylate, lauryl (meth)acrylate, 2-phenoxyethyl (meth)acrylate, 3-phenoxy benzyl (meth)acrylate, phenoxy diethyleneglycol (meth)acrylate, phenoxy polyethylene glycol (meth)acrylate, 4-tert-butylcyclohexanol (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxy group-containing monomers such as (meth) acrylic acid, (meth)acrylic acid dimer, carboxyethyl (meth) acrylate, carboxypentyl (meth)acrylate, and ω-carboxy-polycaprolactone (meth)acrylate; heterocycle-containing monomers such as N-(meth)acryloylmorpholine, N-vinylpyrrolidone, N-vinylcaprolactam, N-(meth)acryloylpiperidine, N-(meth)acryloylpyrrolidine, 3-(3-pyridine)propyl (meth)acrylate, and cyclic trimethylolpropane formal acrylate; maleimide-based monomers such as maleimide, N-cyclohexylmaleimide, and N-phenylmaleimide; amide-based monomers such as (meth)acrylamide, N,N-dimethyl (meth) acrylamide, N,N-diethyl (meth)acrylamide, N-hexyl (meth) acrylamide, N-methyl (meth)acrylamide, N-ethyl (meth) acrylamide, N-butyl (meth)acrylamide, N-methylol (meth) acrylamide, and N-methylolpropane (meth)acrylamide; aminoalkyl (meth)acrylate-based monomers such as aminoethyl (meth)acrylate, aminopropyl (meth)acrylate, N,N-dimethylaminoethyl (meth)acrylate, and tert-butylaminoethyl (meth)acrylate; and succinimide-based monomers such as N-(meth)acryloyloxymethylene succinimide, N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of an alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecanediol di(meth)acrylate, 1,20-eicosanediol di(meth) acrylate, isopentyldiol di(meth)acrylate, 3-ethyl-1,8-octanediol di(meth)acrylate, EO adduct of bisphenol A di(meth)acrylate, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth) acrylate, ditrimethylolpropane tetra(meth)acrylate, dipentaerythritol tetra(meth)acrylate, dipentaerythritol penta (meth)acrylate, dipentaerythritol hexa(meth)acrylate, and caprolactone-modified tris[(meth)acryloyloxyethyl]isocyanurate.

The photopolymerization initiator can be appropriately selected from known radical photopolymerization initiators for use. Examples of the photopolymerization initiator include 1-hydroxycyclohexyl phenyl ketone (Omnirad 184, manufactured by IGM Resins B.V.), 2,2-dimethoxy-2-phenylacetophenone, 1-(4-isopropylphenyl)-2-hydroxy-2-methylpropane-1-one, bis(2,6-dimethoxybenzoyl)-2,4,4-trimethylpentylphosphine oxide, 2-methyl-1-[4-(methylthio)phenyl]-2-morpholino-propane-1-one (Omnirad 907, manufactured by IGM Resins B.V.), 2,4,6-trimethylbenzoyl diphenylphosphine oxide (Omnirad TPO, manufactured by IGM Resins B.V.), and bis(2,4,6-trimethylbenzoyl)phenylphosphine oxide (Omnirad 819, manufactured by IGM Resins B.V.).

The content of the photopolymerization initiator may be 1 part by mass or more and 10 parts by mass or less, 2 parts by mass or more and 8 parts by mass or less, or 3 parts by mass or more and 7 parts by mass or less, with respect to 100 parts by mass of the total amount of the photopolymerizable compound.

The photosensitizer includes at least one photosensitizer selected from the group consisting of an anthracene-based photosensitizer and a naphthalene-based photosensitizer.

The anthracene-based photosensitizer is not particularly limited, but from the viewpoint that color peeling is further less likely to occur, may be an anthracene compound have a substituent in which one or more hydrogen atoms of the anthracene ring are substituted with another group. The substituent may be one or more, and in a case where there are a plurality of substituents, these substituents may be the same as or different from each other. Examples of the substituent include an alkoxy group and an alkylcarbonyloxy group. The number of carbon atoms in the alkoxy group may be 1 to 10, 2 to 8, 2 to 6, or 2 to 4. The alkoxy group may be linear or branched. Specific examples of the alkoxy group include an ethoxy group, a propoxy group, a butoxy group, and a 2-ethylhexyloxy group. The number of carbon atoms of the alkyl group in the alkylcarbonyloxy group may be 1 to 10 or 2 to 8. The alkyl group in the alkylcarbonyloxy group may be linear or branched. Specific examples of the alkylcarbonyloxy group include an octanoyloxy group.

The naphthalene-based photosensitizer is not particularly limited, but from the viewpoint that color peeling is further less likely to occur, may be a naphthalene compound having a substituent in which one or more hydrogen atoms of the naphthalene ring are substituted with another group. The substituent may be one or more, and in a case where there are a plurality of substituents, these substituents may be the same as or different from each other. Examples of the substituent include an alkoxy group. The number of carbon atoms in the alkoxy group may be 1 to 10, 2 to 8, 2 to 6, or 2 to 4. The alkoxy group may be linear or branched. Specific examples of the alkoxy group include an ethoxy group, a propoxy group, and a butoxy group.

From the viewpoint that color peeling is further less likely to occur, the anthracene-based photosensitizer may include a 9,10-di-substituted form, and examples of the 9,10-di-substituted form include 9,10-dialkoxyanthracene such as 9,10-diethoxyanthracene and 9,10-dibutoxyanthracene, and 9,10-dialkylcarbonyloxyanthracene such as 9,10-bis(octanoyloxy)anthracene. From the same viewpoint, the naphthalene-based photosensitizer may include a 1,4-di-substituted form, and examples of the 1,4-di-substituted form include 1,4-dialkoxynaphthalene such as 1,4-diethoxynaphthalene. The photosensitizer may be used singly or in combination of two or more kinds thereof.

From the viewpoint that color peeling is less likely to occur, the content of the photosensitizer is 0.01 parts by mass or more and less than 3.00 parts by mass with respect to 100 parts by mass of the total amount of the photopolymerizable compound. When the content of the photosensitizer is within the above range, the curing failure of the resin layer due to the presence of the organic pigment can be suppressed, and excessive light absorption by the photosensitizer can be suppressed. Thereby, the curing of the resin layer is performed well, and the color peeling of the optical fiber can be suppressed. From the viewpoint that color peeling is further less likely to occur, the content of the photosensitizer may be 0.03 parts by mass or more, 0.05 parts by mass or more, 0.07 parts by mass or more, 0.09 parts by mass or more, or 0.10 parts by mass or more, and may be 2.90 parts by mass or less, 2.80 parts by mass or less, 2.70 parts by mass or less, 2.60 parts by mass or less, or 2.50 parts by mass or less, with respect to 100 parts by mass of the total amount of the photopolymerizable compound. From the viewpoint that color peeling is further less likely to occur, the content of the photosensitizer may be 0.03 parts by mass or more and 2.90 parts by mass or less, 0.05 parts by mass or more and 2.80 parts by mass or less, 0.07 parts by mass or more and 2.70 parts by mass or less, 0.09 parts by mass or more and 2.60 parts by mass or less, or 0.10 parts by mass or more and 2.50 parts by mass or less, with respect to 100 parts by mass of the total amount of the photopolymerizable compound.

The organic pigment is not particularly limited as long as it is an organic pigment used in the coloration of the optical fiber. Examples of the organic pigment include a phthalocyanine-based pigment and an azo-based pigment. From the viewpoint that color peeling is further less likely to occur, the organic pigment may include at least one selected from the group consisting of a phthalocyanine-based pigment and an azo-based pigment. Examples of the phthalocyanine-based pigment include a copper phthalocyanine-based pigment. Examples of the azo-based pigment include an insoluble azo pigment and a condensed azo pigment, and examples of the insoluble azo pigment include a monoazo-based pigment and a disazo-based pigment. The organic pigment may be subjected to various treatments such as surface modification and formation of a composite pigment. The organic pigment may be used singly or in combination of two or more kinds thereof.

The content of the organic pigment may be 0.1 parts by mass or more and 10.0 parts by mass or less, 0.5 parts by mass or more and 8.0 parts by mass or less, or 1.0 part by mass or more and 5.0 parts by mass or less, with respect to 100 parts by mass of the total amount of the photopolymerizable compound.

From the viewpoint of coloring the resin layer, the resin composition according to the present embodiment can further contain titanium oxide particles. As the titanium oxide particles, surface-treated titanium oxide particles may be used. The surface-treated titanium oxide particles are particles in which titanium oxide is surface-treated with an inorganic substance, and have excellent dispersibility in the resin composition.

Examples of the inorganic substance used for the surface treatment include aluminum oxide, silicon dioxide, and zirconium dioxide. When the surface-treated titanium oxide particles have a surface-treated layer containing at least one selected from the group consisting of aluminum oxide, silicon dioxide, and zirconium dioxide, dispersibility can be further improved. The surface-treated layer may be formed on at least a portion of the surface of the titanium oxide particles, and may be formed on the entire surface of the titanium oxide particles. The surface-treated layer is formed by the surface treatment of the titanium oxide particles.

The amount of the surface-treated layer in the surface-treated titanium oxide particles may be 1% by mass or more, 1.5% by mass or more, or 2% by mass or more from the viewpoint of improving dispersibility, and may be 10% by mass or less, 9% by mass or less, or 8% by mass or less from the viewpoint of increasing hiding power. The amount of the surface-treated layer can be calculated by measuring the amount of the titanium element and an inorganic element other than titanium contained in the surface-treated titanium oxide particles using inductively coupled mass spectrometry (ICP-MS).

From the viewpoint of improving the lateral pressure resistance of the coating resin layer, the average primary particle diameter of the surface-treated titanium oxide particles may be 300 nm or less, 295 nm or less, or 290 nm or less. From the viewpoint of increasing hiding power, the average primary particle diameter of the surface-treated titanium oxide particles may be 100 nm or more, 150 nm or more, or 200 nm or more. The average primary particle diameter of the surface-treated titanium oxide particles may be 200 nm or more and 300 nm or less. The average primary particle diameter can be measured, for example, by image analysis of electron micrographs, a light scattering method, a BET method, or the like.

From the viewpoint of improving the visibility of the resin layer, the content of the surface-treated titanium oxide particles may be 0.6% by mass or more, 1.0% by mass or more, 2.0% by mass or more, or 3.0% by mass or more, based on the total amount of the resin composition. From the viewpoint of enhancing the curability of the resin composition, the content of the surface-treated titanium oxide particles may be 20.0% by mass or less, 15.0% by mass or less, 10.0% by mass or less, or 8.0% by mass or less, based on the total amount of the resin composition.

The resin composition according to the present embodiment can further contain a polydimethylsiloxane compound from the viewpoint that color peeling is further less likely to occur. The polydimethylsiloxane compound is a compound having, as a repeating unit, a dimethylsiloxane skeleton ($—Si(CH_3)_2O—$) configured by two methyl groups and the oxygen atom bonded to the silicon atom in the main chain.

From the viewpoint that color peeling is further less likely to occur, the amount of silicon atom (Si) contained in the polydimethylsiloxane compound may be 5% by mass or more and 40% by mass or less. The amount of Si contained in the polydimethylsiloxane compound can be measured by inductively coupled plasma optical emission spectrometry (ICP-OES) of the polydimethylsiloxane compound. From the viewpoint of further suppressing color peeling, the Si amount may be 8% by mass or more, 10% by mass or more, or 14% by mass or more. Furthermore, from the viewpoint of improving the stability of the resin composition, the Si amount may be 38% by mass or less, 36% by mass or less, or 34% by mass or less.

From the viewpoint of improving the storage stability of the resin composition, the polydimethylsiloxane compound may have a (meth)acryloyl group. The polydimethylsiloxane compound may have a (meth)acryloyl group at a side chain or a terminal. The polydimethylsiloxane compound having a (meth)acryloyl group can be copolymerized with the photopolymerizable compound. In the present embodiment, the polydimethylsiloxane compound having a (meth)acryloyl group is not included in the photopolymerizable compound. The number of (meth)acryloyl groups of the polydimethylsiloxane compound may be 1 or more or 2 or more, and may be 10 or less, 8 or less, 6 or less, or 4 or less.

The polydimethylsiloxane compound may have an alkylene oxide unit at a side chain or a terminal. Examples of the alkylene oxide include ethylene oxide (EO) and propylene oxide (PO).

The amounts of a dimethylsiloxane unit (hereinafter, referred to as "DMS unit") and an alkylene oxide unit (hereinafter, referred to as "RO unit") contained in the polydimethylsiloxane compound can be calculated by measuring $^{1}H$ NMR of the polydimethylsiloxane compound. From the viewpoint of the storage stability of the resin composition, the molar ratio of the DMS unit may be 14% by mol or more, 16% by mol or more, or 20% by mol or more, based on the total amount of the DMS unit and the RO unit. Furthermore, from the viewpoint of the compatibility with the epoxy di(meth)acrylate, the molar ratio of the DMS unit may be 70% by mol or less, 60% by mol or less, or 50% by mol or less, based on the total amount of the DMS unit and the RO unit.

The content of the polydimethylsiloxane compound may be 0.5 parts by mass or more, 1.0 part by mass or more, or 1.5 parts by mass or more, and may be 10.0 parts by mass or less, 8.0 parts by mass or less, or 6.0 parts by mass or less, with respect to 100 parts by mass of the total amount of the photopolymerizable compound.

The resin composition according to the present embodiment may further contain a silane coupling agent, a leveling agent, an antifoaming agent, an antioxidant, and the like.

The silane coupling agent is not particularly limited as long as it causes no inhibition in curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxylcyclohexyl)-ethyltrimethoxysilane, dimethoxydimethylsilane, diethoxydimethylsilane, 3-acryloxypropyl trimethoxysilane, γ-glycidoxypropyl trimethoxysilane, γ-glycidoxypropylmethyl diethoxysilane, γ-methacryloxypropyl trimethoxysilane, N-(β-aminoethyl)-γ-aminopropyl trimethoxysilane, dimethoxysilane, N-(β-aminoethyl)-γ-aminopropyltrimethyl N-phenyl-γ-aminopropyl trimethoxysilane, γ-chloropropyl trimethoxysilane, γ-mercaptopropyl trimethoxysilane, γ-aminopropyl trimethoxysilane, bis-[3-(triethoxysilyl)propyl]tetrasulfide, bis-[3-(triethoxysilyl)propyl]disulfide, γ-trimethoxysilylpropyl dimethylthiocarbamyl tetrasulfide, and γ-trimethoxysilylpropyl benzothiazyl tetrasulfide.

The viscosity at 25° C. of the resin composition may be 800 mPa·s or more, 1000 mPa·s or more, or 1500 mPa·s or more from the viewpoint of storage stability, and may be less than 10000 mPa·s, 9000 mPa·s or less, or 8500 mPa·s or less from the viewpoint of coatability.

From the viewpoint of the resistance to moist heat of the optical fiber, the Young's modulus of the resin layer may be 400 MPa or more, 450 MPa or more, or 500 MPa or more at 23° C. From the viewpoint of forming a resin layer excellent in toughness, the Young's modulus of the resin layer may be 1500 MPa or less, 1200 MPa or less, or 1000 MPa or less at 23° C.

The resin composition according to the present embodiment can be suitably used as a colored coating material for an optical fiber. By forming an outermost layer of the coating resin layer of the optical fiber using the colored coating material containing the resin composition according to the present embodiment, an optical fiber in which color peeling is less likely to occur can be produced.

Optical Fiber

FIG. 1 is a schematic cross-sectional view illustrating a configuration of an optical fiber according to an embodiment. As illustrated in FIG. 1, an optical fiber 1A includes a glass fiber 10 and a coating resin layer 20 being in contact with the glass fiber 10 and covering an outer periphery of the glass fiber 10. The coating resin layer 20 includes a primary resin layer 22, a secondary resin layer 24, and a colored resin layer 26.

The glass fiber 10 is a light guiding optical transmission medium that transmits light introduced to the optical fiber 1A. The glass fiber 10 is a member made of glass, and is configured, for example, with silica ($SiO_2$) glass as a base material (main component). The glass fiber 10 includes a core 12 and a cladding 14 covering the core 12. The core 12 is provided, for example, in an area including a center axis of the glass fiber 10. The core 12 is made of, for example, pure $SiO_2$ glass, or $SiO_2$ glass containing germanium dioxide ($GeO_2$) and/or a fluorine element, or the like. The cladding 14 is provided in an area surrounding the core 12. The cladding 14 has a refractive index lower than a refractive index of the core 12. The cladding 14 is made of, for example, pure $SiO_2$ glass, or $SiO_2$ glass added with a fluorine element. The outer diameter of the glass fiber 10 is about 100 to 125 μm, and the diameter of the core 12 constituting the glass fiber 10 is about 7 to 15 μm.

The coating resin layer 20 is an ultraviolet curable resin layer covering the cladding 14. The coating resin layer 20 includes the primary resin layer 22 coating an outer periphery of the glass fiber 10, the secondary resin layer 24 coating an outer periphery of the primary resin layer 22, and the colored resin layer 26 coating an outer periphery of the secondary resin layer 24. The primary resin layer 22 is in contact with an outer peripheral surface of the cladding 14 and coats the entire cladding 14. The secondary resin layer 24 is in contact with an outer peripheral surface of the primary resin layer 22 and coats the entire primary resin layer 22. The colored resin layer 26 is in contact with an outer peripheral surface of the secondary resin layer 24 and coats the entire secondary resin layer 24. The thickness of the primary resin layer 22 is, for example, 10 μm or more and 50 μm or less. The thickness of the secondary resin layer 24 is, for example, 10 μm or more and 40 μm or less. The thickness of the colored resin layer 26 is, for example, 3 μm or more and 10 μm or less.

The primary resin layer 22 can be formed by using a conventional known resin composition for a primary resin layer. The secondary resin layer 24 can be formed by using a conventional known resin composition for a secondary resin layer.

The colored resin layer 26 can be formed by curing the resin composition according to the present embodiment. When the colored resin layer 26 contains a cured product of the resin composition according to the present embodiment, an optical fiber in which color peeling is less likely to occur can be produced.

Figure 2:
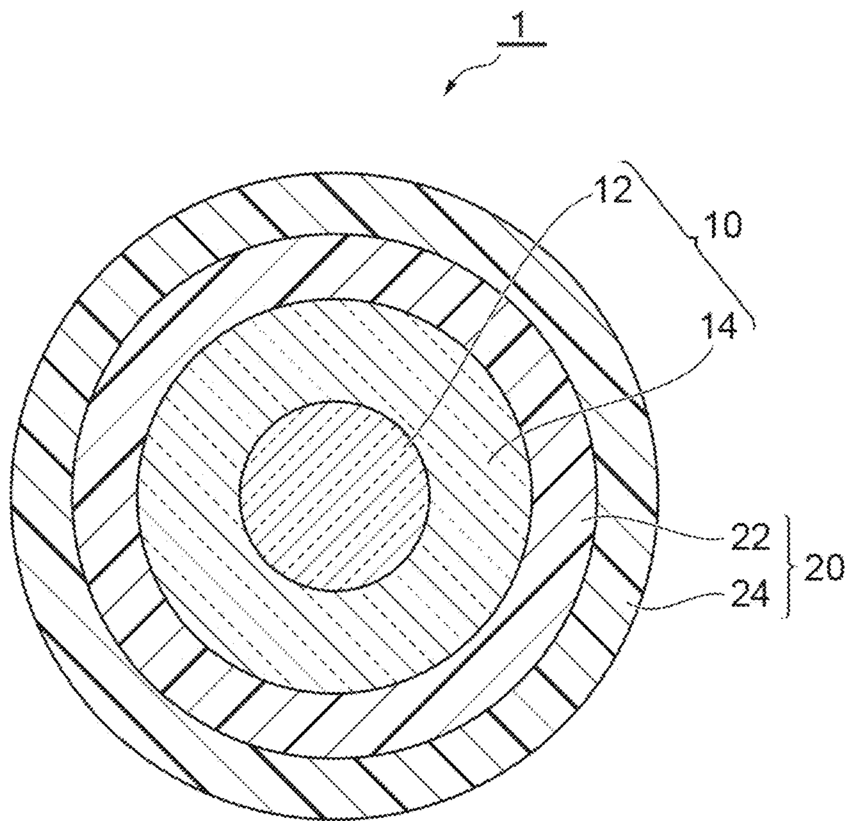
FIG. 2 is a schematic cross-sectional view illustrating an example of an optical fiber according to the present embodiment.

The resin composition according to the present embodiment can be applied to the secondary resin layer 24. In this case, as illustrated in FIG. 2, an optical fiber 1 includes a glass fiber 10 and a coating resin layer 20 being in contact with the glass fiber 10 and covering an outer periphery of the glass fiber 10. The coating resin layer 20 includes a primary resin layer 22 and a secondary resin layer 24. The secondary resin layer 24 can be formed by curing the resin composition according to the present embodiment. When the secondary resin layer 24 contains a cured product of the resin composition according to the present embodiment, an optical fiber in which color peeling is less likely to occur can be produced. In the optical fiber ribbon using an optical fiber having this secondary resin layer 24 as an outermost layer, when an operation of taking out the optical fiber by removing a ribbon material is performed, the secondary resin layer 24 is less likely to be peeled off from the optical fiber.

Optical Fiber Ribbon

An optical fiber ribbon using the optical fiber according to the present embodiment can be produced. In the optical fiber ribbon, a plurality of the above-described optical fibers are arranged in parallel and coated with a ribbon resin.

Figure 3:
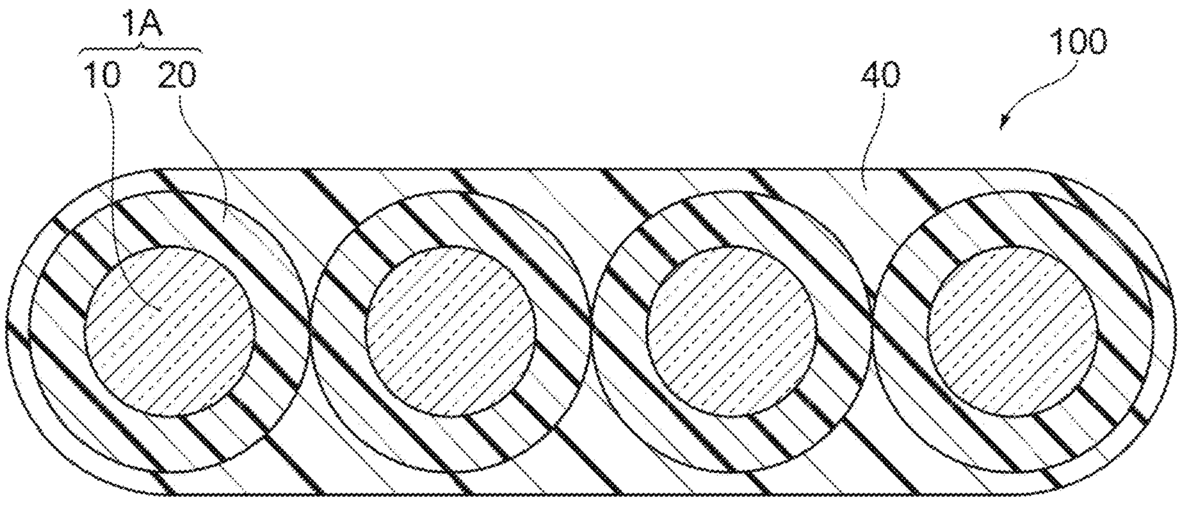
FIG. 3 is a schematic cross-sectional view illustrating an example of an optical fiber ribbon according to the present embodiment.

FIG. 3 is a schematic cross-sectional view illustrating an optical fiber ribbon according to the present embodiment. An optical fiber ribbon 100 includes a plurality of optical fibers 1A, and a connecting resin layer 40 in which the optical fibers 1A are coated with a ribbon resin and connected. The connecting resin layer 40 is formed by a ribbon resin. In FIG. 3, as an example, four optical fibers are illustrated, but the number thereof is not particularly limited.

As the ribbon resin, a resin material generally known as a ribbon material can be used. From the viewpoint of damage preventing property, dividing easiness, and the like of the optical fiber, the ribbon resin may include a thermosetting resin such as a silicone resin, an epoxy resin, or a urethane resin, or an ultraviolet curable resin such as epoxy acrylate, urethane acrylate, or polyester acrylate.

When the optical fiber ribbon according to the present embodiment uses the above-described optical fiber, when an operation of taking out the optical fiber by removing the connecting resin layer from the optical fiber ribbon, color peeling is less likely to occur.

EXAMPLES

The following will describe the present disclosure in further detail with showing results of evaluation tests using Examples and Comparative Examples according to the present disclosure, but the present invention is not limited to these Examples.

Resin Composition for Colored Resin Layer

As a photopolymerizable compound, epoxy acrylate (EA) which is acrylic acid adducts of bisphenol A diglycidyl ether, tripropylene glycol diacrylate (TPGDA), EO-modified trimethylolpropane triacrylate ($TMP(EO)_3TA$, $TMP(EO)_{15}TA$), and EO-modified bisphenol A diacrylate ($BPA(EO)_{30}DA$) were prepared.

As a photopolymerization initiator, 1-hydroxycyclohexyl phenyl ketone (Omnirad 184) and 2,4,6-trimethylbenzoyl diphenylphosphine oxide (Omnirad TPO) were prepared.

As a photosensitizer, 9,10-dibutoxyanthracene and 1,4-diethoxynaphthalene were prepared.

As an organic pigment, a blue phthalocyanine-based pigment, a red azo-based pigment, and a yellow azo-based pigment were prepared.

As titanium oxide particles, surface-treated titanium oxide particles having a surface-treated layer containing aluminum oxide ($Al_2O_3$) were prepared. The average primary particle diameter of the surface-treated titanium oxide particles was 200 to 300 nm, and the amount of $Al_2O_3$ calculated by ICP-MS measurement was 2.5% by mass.

As a polydimethylsiloxane compound, a polydimethylsiloxane compound having a (meth)acryloyl group (number of (meth)acryloyl groups: 2; amount of Si: 21% by mass) was prepared. The amount of Si contained in the polydimethylsiloxane compound was measured by ICP-OES according to the following procedure. First, 2 mL of hydrofluoric acid and 6 mL of nitric acid were added to 0.1 g of the polydimethylsiloxane compound, and the mixture was heated to 200° C. for 30 minutes using a microwave decomposition apparatus, held for 20 minutes, and then cooled to ordinary temperature, thereby obtaining a decomposed solution of the polydimethylsiloxane compound. Next, the decomposed solution was diluted 50-fold with ultrapure water to prepare a sample. The amount of Si contained in the polydimethylsiloxane compound was calculated by quantifying Si in the sample using an ICP emission spectrometer ("iCAP6300" manufactured by Thermo Fisher Scientific Inc.).

After mixing the photopolymerizable compound, the photopolymerization initiator, the photosensitizer, the organic pigment, and the polydimethylsiloxane compound in the blending amount (parts by mass) shown in Table 1 and Table 2, mixing was performed so that the content of the surface-treated titanium oxide particles in the resin composition was 5.00% by mass, thereby preparing a resin composition.

Test Examples 1 to 9 correspond to Examples, and Test Examples 10 and 11 correspond to Comparative Examples.

Young's Modulus

A resin composition was applied onto a polyethylene terephthalate (PET) film using a spin coater, and then cured using an electrodeless UV lamp system ("VPS600 (D bulb)" manufactured by Heraeus K. K.) under the conditions of $1000\pm100$ mJ/cm$^2$ to form a resin layer having a thickness of $50\pm5$ μm on the PET film. The resin layer was peeled off from the PET film to obtain a resin film.

The resin film was punched into a dumbbell shape of JIS K 7127 Type 5, and pulled under the conditions of $23\pm2$° C. and $50\pm10$% RH using a tensile tester at a tension rate of 1 mm/min and a gauge line distance of 25 mm to obtain a stress-strain curve. The Young's modulus was determined from 2.5% secant line.

Viscosity

The viscosity at 25° C. of the resin composition was measured using a rheometer ("MCR-102" manufactured by Anton Paar GmbH) at a cone plate CP25-2 under the condition of a shear rate of 10 $s^{-1}$.

Resin Composition for Primary Resin Layer 75 parts by mass of a urethane acrylate oligomer, which is a reaction product of polypropylene glycol having a molecular weight of 4000, isophorone diisocyanate, 2-hydroxyethyl acrylate, and methanol, 12 parts by mass of nonylphenol EO-modified acrylate, 6 parts by mass of N-vinylcaprolactam, 2 parts by mass of 1,6-hexanediol diacrylate, 1 part by mass of Omnirad TPO, and 1 part by mass of 3-mercaptopropyl trimethoxysilane were mixed to prepare a resin composition P.

Resin Composition for Secondary Resin Layer 40 parts by mass of a urethane acrylate oligomer, which is a reaction product of polypropylene glycol having a molecular weight of 600, 2,4-tolylene diisocyanate, and 2-hydroxyethyl acrylate, 35 parts by mass of isobornyl acrylate, 24 parts by mass of epoxy acrylate, which is an acrylic acid adduct of bisphenol A diglycidyl ether, 1 part by mass of Omnirad TPO, and 1 part by mass of Omnirad 184 were mixed to prepare a resin composition S.

Resin Composition for Ribbon 18 parts by mass of urethane acrylate, which is a reaction product of bisphenol A-ethylene oxide addition diol, tolylene diisocyanate, and hydroxyethyl acrylate, 10 parts by mass of urethane acrylate, which is a reaction product of polytetramethylene glycol, tolylene diisocyanate, and hydroxyethyl acrylate, 15 parts by mass of tricyclodecanedimethanol diacrylate, 10 parts by mass of N-vinylpyrrolidone, 10 parts by mass of isobornyl acrylate, 5 parts by mass of bisphenol A-ethylene oxide addition diol diacrylate, 0.7 parts by mass of 2-methyl-1-[4-(methylthio)phenyl]-2-morpholino-propane-1-one (Omnirad 907), and 1.3 parts by mass of Omnirad TPO were mixed to prepare a resin composition R.

Production of Optical Fiber

A primary resin layer having a thickness of 17.5 μm was formed using the resin composition P on the outer periphery of the glass fiber having a diameter of 125 μm and composed of a core and a cladding, and a secondary resin layer having a thickness of 15 μm was further formed using the resin composition S on the outer periphery thereof, thereby producing an optical fiber. Next, after temporarily winding the optical fiber, a colored resin layer having a thickness of 5 μm was formed using the resin composition of each of Test Examples 1 to 11 on the outer periphery of the secondary resin layer while feeding out the optical fiber again by a coloring machine, thereby producing an optical fiber (hereinafter, referred to as "colored optical fiber") having a diameter of 200 μm and having the colored resin layer. The linear speed at the time of forming each resin layer was set to 1500 m/min.

Production of Optical Fiber Ribbon

Four colored optical fibers were prepared, the resin composition R for a ribbon was coated, and the resin composition was then cured by irradiation with ultraviolet rays to form a connecting resin layer, thereby producing an optical fiber ribbon.

Color Peeling Test

The optical fiber ribbon was stored in a dark place at 85° C. and 85% RH for 30 days, and then the optical fibers were separated into individual optical fibers from the optical fiber ribbon in accordance with Telcordia GR-20 5.3.1. The presence or absence of peeling of the colored resin layer at this time were evaluated. A case where there was no peeling in the colored resin layer was evaluated as "A", a case where a part of the ribbon resin remained in the colored resin layer was evaluated as "B", and a case where there was peeling in the colored resin layer was evaluated as "C".

Moist Heat Test

The optical fiber ribbon was immersed in a thermo-hygrostat chamber set at 85° C. and 85% RH for 60 days and then subjected to a moist heat test. Transmission losses at a wavelength of 1.55 μm of the optical fiber ribbon before the moist heat test and after the moist heat test were measured by an OTDR (Optical Time Domain Reflectometer) method. A case where a difference between the transmission loss after the moist heat test and the transmission loss before the moist heat test is 0.05 dB/km or less was evaluated as "A", and a case where the difference is more than 0.05 dB/km was evaluated as "B".

TABLE 1

| Test Example | 1 | 2 | 3 | 4 | 5 |
|---|---|---|---|---|---|
| EA | 55.00 | 55.00 | 55.00 | 55.00 | 55.00 |
| TPGDA | 15.00 | 15.00 | 15.00 | 15.00 | 15.00 |
| $TMP(EO)_3TA$ | 10.00 | 10.00 | 10.00 | 10.00 | 10.00 |
| $TMP(EO)_{15}TA$ | 10.00 | 10.00 | 10.00 | 10.00 | 10.00 |
| $BPA(EO)_{30}DA$ | 10.00 | 10.00 | 10.00 | 10.00 | 10.00 |
| Omnirad 184 | 4.00 | 4.00 | 4.00 | 4.00 | 4.00 |
| Omnirad TPO | 1.00 | 1.00 | 1.00 | 1.00 | 1.00 |
| 9,10-Dibutoxyanthracene | 0.80 | 0.80 | 0.80 | 2.00 | 0.10 |
| Blue phthalocyanine-based pigment | 1.50 | — | — | 1.50 | 1.50 |
| Red azo-based pigment | — | 1.50 | — | — | — |
| Yellow azo-based pigment | — | — | 1.50 | — | — |
| $TiO_2$ (% by mass) | 5.00 | 5.00 | 5.00 | 5.00 | 5.00 |
| Polydimethylsiloxane compound | 2.00 | 2.00 | 2.00 | 2.00 | 2.00 |
| Young's modulus (MPa) | 1000 | 1000 | 1000 | 900 | 1000 |
| Viscosity (mPa · s) | 4000 | 4000 | 4000 | 4000 | 4000 |
| Color peeling test | A | A | A | A | A |
| Moist heat test | A | A | A | A | A |

TABLE 2

| Test Example | 6 | 7 | 8 | 9 | 10 | 11 |
|---|---|---|---|---|---|---|
| EA | 55.00 | 55.00 | 55.00 | 55.00 | 55.00 | 55.00 |
| TPGDA | 15.00 | 15.00 | 15.00 | 15.00 | 15.00 | 15.00 |
| $TMP(EO)_3TA$ | 10.00 | 10.00 | 10.00 | 10.00 | 10.00 | 10.00 |
| $TMP(EO)_{15}TA$ | 10.00 | 10.00 | 10.00 | 10.00 | 10.00 | 10.00 |
| $BPA(EO)_{30}DA$ | 10.00 | 10.00 | 10.00 | 10.00 | 10.00 | 10.00 |
| Omnirad 184 | 4.00 | 4.00 | 4.00 | 4.00 | 4.00 | 4.00 |

TABLE 2-continued

| Test Example | 6 | 7 | 8 | 9 | 10 | 11 |
|---|---|---|---|---|---|---|
| Omnirad TPO | 1.00 | 1.00 | 1.00 | 1.00 | 1.00 | 1.00 |
| 9,10-dibutoxyanthracene | — | — | — | — | 3.00 | — |
| 1,4-diethoxynaphthalene | 0.30 | 1.00 | 2.00 | 2.50 | — | — |
| Blue phthalocyanine-based pigment | 1.50 | 1.50 | 1.50 | 1.50 | 1.50 | 1.50 |
| $TiO_2$ (% by mass) | 5.00 | 5.00 | 5.00 | 5.00 | 5.00 | 5.00 |
| Polydimethylsiloxane compound | 2.00 | 2.00 | 2.00 | 2.00 | 2.00 | 2.00 |
| Young's modulus (MPa) | 1000 | 1000 | 1000 | 1000 | 800 | 1000 |
| Viscosity (mPa · s) | 4000 | 4000 | 4000 | 4000 | 4000 | 4000 |
| Color peeling test | A | A | A | A | C | B |
| Moist heat test | A | A | A | A | A | A |

REFERENCE SIGNS LIST

1, 1A: optical fiber
10: glass fiber
12: core
14: cladding
20: coating resin layer
22: primary resin layer
24: secondary resin layer
26: colored resin layer
40: connecting resin layer
100: optical fiber ribbon

What is claimed is:

1. A resin composition for colored coating on an optical fiber, the resin composition comprising a photopolymerizable compound, a photopolymerization initiator, a photosensitizer, and an organic pigment, wherein the photosensitizer includes at least one selected from the group consisting of an anthracene-based photosensitizer and a naphthalene-based photosensitizer, and a content of the photosensitizer is 0.01 parts by mass or more and less than 3.00 parts by mass with respect to 100 parts by mass of the total amount of the photopolymerizable compound.

2. The resin composition according to claim 1, wherein the anthracene-based photosensitizer includes at least one selected from the group consisting of 9,10-diethoxyanthracene, 9,10-dibutoxyanthracene, and 9,10-bis(octanoyloxy) anthracene.

3. The resin composition according to claim 1, wherein the naphthalene-based photosensitizer includes 1,4-diethoxynaphthalene.

4. The resin composition according to claim 1, wherein the organic pigment includes at least one selected from the group consisting of a phthalocyanine-based pigment and an azo-based pigment.

5. The resin composition according to claim 1, further comprising a titanium oxide.

6. An optical fiber comprising:

a glass fiber including a core and a cladding;

a primary resin layer being in contact with the glass fiber and coating the glass fiber;

a secondary resin layer coating the primary resin layer; and a colored resin layer coating the secondary resin layer, wherein the colored resin layer contains a cured product of the resin composition according to claim 1.

7. An optical fiber ribbon in which a plurality of optical fibers according to claim 6 are arranged in parallel and coated with a ribbon resin.

8. An optical fiber comprising:

a glass fiber including a core and a cladding;

a primary resin layer being in contact with the glass fiber and coating the glass fiber; and a secondary resin layer coating the primary resin layer, wherein the secondary resin layer contains a cured product of the resin composition according to claim 1.

9. An optical fiber ribbon in which a plurality of optical fibers according to claim 8 are arranged in parallel and coated with a ribbon resin.

* * * * *